United States Patent
Cheng et al.

(10) Patent No.: US 7,380,209 B2
(45) Date of Patent: May 27, 2008

(54) MANAGING ELECTRONIC DOCUMENTS UTILIZING A DIGITAL SEAL

(75) Inventors: Keh-Shin F. Cheng, Mahopac, NY (US); Ting D. Cheng, Mahopac, NY (US); John O. Long, Raleigh, NC (US); Emily C. Plachy, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 10/662,164

(22) Filed: Sep. 2, 2003

(65) Prior Publication Data

US 2005/0050468 A1 Mar. 3, 2005

(51) Int. Cl.
*G06F 15/00* (2006.01)
*G06F 17/30* (2006.01)
*H04L 9/00* (2006.01)
*H04K 1/00* (2006.01)

(52) U.S. Cl. .................. 715/530; 715/501.1; 713/176; 713/182; 726/26

(58) Field of Classification Search ................ 715/530; 713/161, 165, 166, 170, 176; 707/10; 726/26
See application file for complete search history.

(56) References Cited

U.S. PATENT DOCUMENTS

| | | | |
|---|---|---|---|
| 5,303,379 A | | 4/1994 | Khoyi et al. |
| 5,673,316 A | * | 9/1997 | Auerbach et al. ............. 705/51 |
| 5,948,103 A | * | 9/1999 | Fukuzaki ..................... 726/27 |
| 5,973,028 A | * | 10/1999 | Maxwell et al. ............ 523/172 |
| 6,181,837 B1 | | 1/2001 | Cahill et al. |
| 6,185,683 B1 | * | 2/2001 | Ginter et al. ............... 713/176 |
| 6,263,313 B1 | * | 7/2001 | Milsted et al. ................. 705/1 |
| 6,326,962 B1 | | 12/2001 | Szabo |
| 6,327,585 B1 | | 12/2001 | Nakano et al. |
| 6,339,825 B2 | * | 1/2002 | Pensak et al. .............. 713/158 |
| 6,345,256 B1 | * | 2/2002 | Milsted et al. ................. 705/1 |
| 6,449,721 B1 | * | 9/2002 | Pensak et al. .............. 713/171 |
| 6,807,633 B1 | * | 10/2004 | Pavlik ........................ 713/170 |
| 6,926,203 B1 | * | 8/2005 | Sehr ........................... 235/492 |
| 7,024,558 B1 | * | 4/2006 | Satake ........................ 713/176 |
| 7,143,290 B1 | * | 11/2006 | Ginter et al. ............... 713/176 |

(Continued)

FOREIGN PATENT DOCUMENTS

JP 10289251 10/1998

(Continued)

OTHER PUBLICATIONS

PageRcall: The Key to Document Protection, Authentica, Inc., Whitepaper, 2003, pp. 1-8.*

(Continued)

*Primary Examiner*—William Bashore
*Assistant Examiner*—Maikhanh Nguyen
(74) *Attorney, Agent, or Firm*—Akerman Senterfitt (57) ABSTRACT

A method for storing electronic documents can include associating a digital seal with at least one electronic document. An image within a user interface can be displayed, wherein the image is a user selectable representation for the digital seal. At least one metadata attribute can be stored as a characteristic related to the digital seal. A storage characteristic of at least one electronic document can be modified based on one or more of the metadata attributes.

7 Claims, 5 Drawing Sheets

U.S. PATENT DOCUMENTS

| | | | |
|---|---|---|---|
| 2002/0035697 A1* | 3/2002 | McCurdy et al. | 713/200 |
| 2002/0091927 A1* | 7/2002 | Wall | 713/176 |
| 2002/0143711 A1* | 10/2002 | Nassiri | 705/76 |
| 2003/0196001 A1* | 10/2003 | Nagahama | 710/1 |
| 2003/0196108 A1* | 10/2003 | Kung | 713/200 |
| 2004/0215624 A1* | 10/2004 | Gonzalez | 707/10 |

FOREIGN PATENT DOCUMENTS

| | | |
|---|---|---|
| JP | 11045283 | 2/1999 |
| JP | 2001195415 | 7/2001 |

OTHER PUBLICATIONS

Z/OS V1R4.0 Security Server RACF Secuirty Administrator's Guide, IBM BookManager Print Preview, SA22-7683-03, IBM Corp., 1994,2002, pp. 1-27.*

A. Myers et al., "Complete, Safe Information Flow with Decentralized Labels", Proceedings of the 1998 IEEE Symposium on Security and Privacy, May 1998, pp. 186-197.*

A. Myers et al., "Protecting Privacy using the Decentralized Label Model", ACM Transactions on Software Engineering and Methodology, Oct. 2000, pp. 1-28.*

Ricadela, A., "Microsoft's Road Map Shows New Windows File System", InformationWeek, Jul. 26, 2002.

* cited by examiner

MANAGING ELECTRONIC DOCUMENTS UTILIZING A DIGITAL SEAL

BACKGROUND OF THE INVENTION

1. Technical Field

The present invention relates to the field of electronic document management.

2. Description of the Related Art

Presently, most mechanisms utilized for storing and retrieving electronic documents involve associating an electronic document with a storage identifier. This storage identifier generally represents a particularized name and path associated with a physical location in which the electronic document is located. Notably, a 1 to 1 relationship exists between each electronic document and storage identifier. While such a document management model is sufficient for storing modest quantities of electronic documents, it is problematic for storing electronic documents in bulk. Specifically, people have problems locating filed electronic documents when required to recall a particular storage identifier.

A number of techniques have been developed to assist users in locating previously stored documents. Storage containers, called folders, allow for the creation of document storage hierarchies. For example, a user can establish three folders, each representing a logical storage category, and store electronic documents accordingly. When such hierarchies are constructed in a meaningful manner and staunchly followed, document storage and retrieval is simplified.

The advent of file managers increased the number of electronic documents most individuals can effectively manage. Notably, file managers can be graphical user interface (GUI) applications designed to visually depict a file storage structure. File managers eliminated the need for users to recall long pathnames and filenames from memory. Instead, users of file managers could respond to visual promptings and navigate to desired files accordingly. Unfortunately, file managers could be confusing to many users not familiar with a physical storage hierarchy of a computer system and the naming conventions associated with various hardware devices. Moreover, even with file managers, large quantities of documents can result in difficulties analogous to locating a virtual needle in a haystack.

Additional document management innovations have sought to ease the burden of electronic document location and storage. For example, icons associated with particular file extensions provide a visual association that can facilitate user recall. Moreover, file pointers, such as shortcuts, can allow for a document reference other than the reference corresponding to the physical storage location of the document. Furthermore, search routines have been developed that can locate documents based on numerous criteria. Despite these file management tools, document storage and retrieval is still problematic to the majority of computer users. Electronic documents are often "lost" within a storage system.

Presupposing conventional document management techniques persist, existing document management problems will only worsen as electronic documents continue to proliferate due to a fundamental flaw. Namely, conventional document management systems are based on a paradigm that focuses on computer hardware and physical storage, not human memory. Accordingly, humans have difficulty recalling conventional storage locations because such locations have little meaning outside a computing environment.

SUMMARY OF INVENTION

The invention disclosed herein provides a method and a system for electronic document management. More particularly, the invention shifts away from a computer focused document management system in favor of a paradigm based on human memory. Specifically, the invention utilizes a new electronic document association object or digital seal. A digital seal is a personalized association mnemonic which is highly configurable for individual users. The digital seal can include multimedia objects in addition to icons and text. Furthermore, digital seals provide more flexible associations with electronic documents than conventional objects. Associative relationships between digital seals and electronic documents can include one seal to one document, one seal to a plurality of documents, one document to a plurality of seals, and a plurality of seals to a plurality of documents.

Notably, it has been shown that the more involvement a human has with an event, the more likely the event will be recallable at a later time. Presently, human involvement during conventional document storage can be restricted to specifying a document name and storage location. Recall of some portion of this choice can be necessary for subsequent document retrieval. Such an interaction can be insufficient to firmly embed a storage event in the mind of the user, resulting in retrieval difficulties. This problem has been resolved using a digital seal that can include extensive human involvement at the document storage stage.

One aspect of the present invention can include a method for storing electronic documents including associating a digital seal with at least one electronic document. In one embodiment, the at least one electronic document can be a plurality of electronic documents. An image can be displayed within a user interface, wherein the image is a user selectable representation for the digital seal. At least one metadata attribute can be stored as a characteristic related to the digital seal. A storage characteristic of at least one electronic document can be modified based on one or more of the metadata attributes. In a particular embodiment, at least one multimedia object can be presented within the user interface. This multimedia object can be a user selectable representation for the digital seal.

In one embodiment, a metadata attribute can be an authorization code that can be required before a selected electronic document can be retrieved. This authorization code can be user specific so that the authorization code can be valid for a first user yet invalid for a second user. In another embodiment, a second digital seal can be associated with one of the electronic documents associated with the first digital seal. In a further embodiment, the second digital seal can be associated with a second authorization code. Such an embodiment can require both the first authorization code and the second authorization code before the associated electronic document can be retrieved. In yet another embodiment, a first user can be required to provide the first authorization code and a second user can be required to provide the second authorization code.

Another aspect of the present invention can include a method of storing electronic documents including identifying an image selected by a user and displayable within an interface and identifying at least one multimedia object selected by the user and presentable within the interface. At least one electronic document selected by the user can be identified. The image, the multimedia objects, and the electronic documents that were identified can be associated with one another. This association can involve a hardware peripheral device. For example, the hardware peripheral device can be a mouse, wherein the association can involve a predefined sequence of mouse selections. In another example, the hardware peripheral can include a selectable option, such as a unique button, designed for performing the association. Triggering this selectable option can be a requirement of performing the association.

At least one electronic document can be stored within a storage system. In one embodiment, the electronic document can be stored in a first storage location and association information about the image and the multimedia objects can be stored in a second storage location. In another embodiment, a network storage location can be accessed across a publicly accessible network and at least one of the electronic documents can be stored within the network storage location. At least one electronic document can be retrieved from the storage system responsive to the user selection of at least one image. Additionally, at least one electronic document can be retrieved from the storage system responsive to the user selection of one of the multimedia objects.

Another aspect of the present invention can include a method of retrieving electronic documents including identifying a selection of a first associative object associated with a first set of electronic documents and identifying a selection of a second associative object associated with a second set of electronic documents. In one embodiment, the first associative object can be a digital seal. In another embodiment, the second associative object can be a container object. In yet another embodiment, the second associative object can be a metadata attribute of a digital seal. A third set of electronic documents can be derived based upon set operations performed upon the first set and the second set. In a particular embodiment, a selection of a Boolean operator can be identified and the Boolean operator can be utilized to form the third set.

The third set of electronic documents can be presented within a user interface. In one embodiment, a graphic that represents one electronic document of the third set of electronic documents can contain a smaller graphic representing at least one associative object associated with the one electronic document. A selection of a portion of the third set of electronic documents can be identified. This portion of electronic documents can then be retrieved from a storage system.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION

The invention disclosed herein provides a method and a system for managing electronic documents utilizing an associative object, such as a digital seal, a digital tag, and/or a digital label. Since of use of the associative object can result in greater user interaction than conventional storage techniques, users can become more involved with the electronic document storage process. This increased involvement can result in increased retention of storage details. Thus, users can more easily recall previously stored electronic documents.

The associative object can contain multiple metadata attributes. Particular ones of these metadata attributes can modify a storage characteristic for one or more electronic documents with which the associative object is associated. Furthermore, the associative object can include selectable multimedia objects that can be presented within an interface, such as a graphical user interface. Associative relationships between associative objects and electronic documents can include one object to one document, one object to many documents, one document to many objects, and many objects to many documents. It is presently preferred that the associative object used for the invention disclosed herein be a digital seal, which is defined herein and utilized throughout the specification. One of ordinary skill in the art can appreciate, however, that any associative object having the properties ascribed to the digital seal is within the scope of the present invention and that the invention is not limited in this regard.

Figure 1:
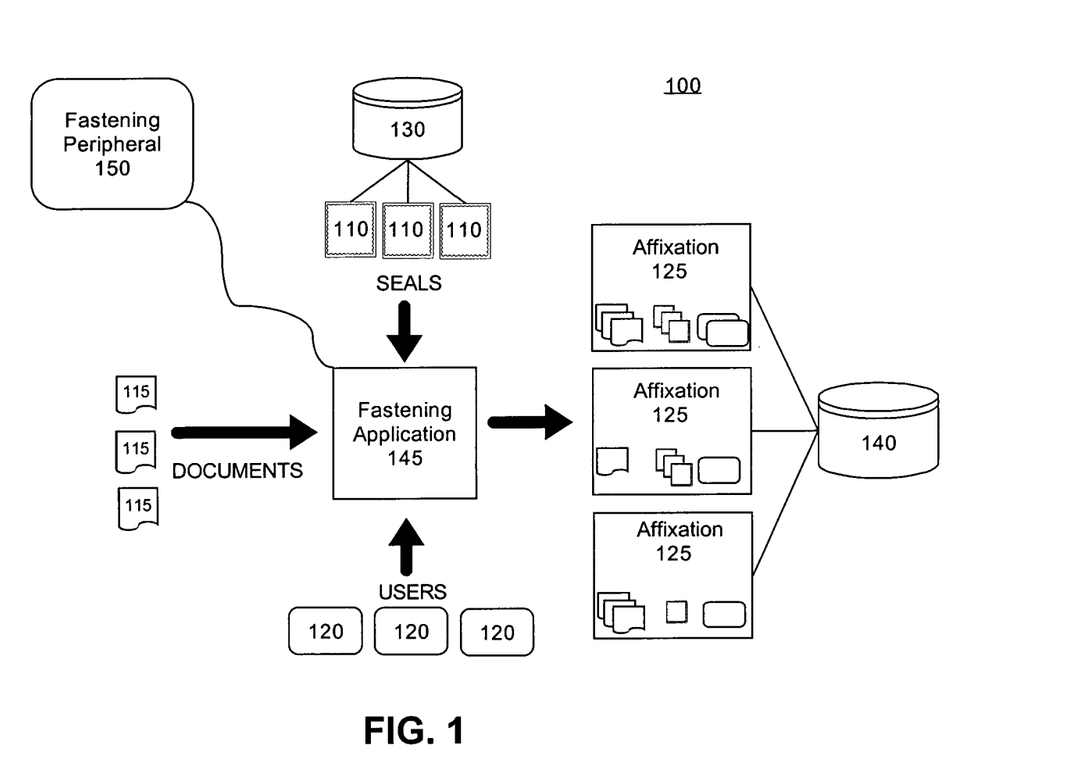
FIG. 1 is a schematic diagram illustrating an exemplary electronic document management system in accordance with the inventive arrangements disclosed herein.

FIG. 1 is a schematic diagram illustrating a system 100 for electronic document management in accordance with the inventive arrangements disclosed herein. As shown in FIG. 1, the system 100 can include a seal repository 130, a storage system 140, and a fastening application 145. The seal repository 130 can be used to store a plurality of digital seals. The seal repository 130 can include a number of preconfigured seals as well as seals created or modified by a user. It should be noted that the seal repository 130 can contain user specific options so that different users accessing the seal repository 130 can be presented with a different set of digital seals. In a particular embodiment, a user will be presented with the same set of digital seals anytime the user accesses the seal repository 130 regardless of the hardware device or computing machine from which the user accesses the seal repository 130.

The storage system 140 can store a plurality of electronic documents as well as the associations each stored electronic document has with one or more digital seals. The storage system 140 can include a plurality of different hardware storage devices located at multiple physical locations which can be distributed across a network. In one embodiment, a user need not know the physical storage methodology or location utilized within the storage system 140 to store and retrieve electronic documents. In another embodiment, the physical storage characteristics of the storage system can be completely transparent to a user.

The fastening application 145 can be an application that binds one or more digital seals with one or more electronic documents. In one embodiment, the fastening application 145 can be a software option available within another application such as a file manager application or an Internet browser. In another embodiment, the fastening application 145 can be a stand-alone software application. Particular embodiments of the fastening application 145 can include a fastening peripheral 150.

The fastening peripheral 150 can be used to provide inputs which can be associated with a fastening event. The fastening peripheral 150 can be connected to a computer system having a fastening application 145. The fastening peripheral 150 executing within the fastening application 145 can translate physical user actions into digital signals having meaning within the fastening application 145. In one embodiment, the fastening peripheral 150 can be a mouse. In such an embodiment, a user of the fastening application 145 can define a sequence of mouse movements and button clicks to constitute a seal authorization event performed in conjunction with a fastening event. In another embodiment, the fastening peripheral 150 can be a unique device that generates a special information signal associated with the device that can be stored within metadata of the digital seal 110. For example, the fastening peripheral 150 can be a peripheral that records biometric fingerprint data used by the fastening application 145 as an authorization code. This biometric fingerprint data can be stored within the metadata of a digital seal 110. In yet another embodiment, the fastening peripheral 150 can be a hardware device modeled after a seal or a stamp that can be used by the fastening application 145 to denote a fastening event.

In operation, a user 120 can instantiate the fastening application 145. The user 120 can select at least one digital seal 110. Each selected digital seal can either be created or retrieved from the seal repository 130. The user 120 can then select at least one electronic document 115. The user 120 can perform a fastening event using the fastening application 145. In particular embodiments, the fastening peripheral 150 can be involved in the fastening event. The result of a fastening event can be an affixation 125. The affixation 125 can associate one digital seal 110 with many electronic documents, one electronic document 115 to many digital seals, one digital seal 110 to one electronic document 115, or many digital seals to many electronic documents. Moreover, user information can be recorded within an affixation 125. The affixations 125 can be stored within the storage system 140.

In one embodiment, the affixation 125 can be a storable software object. In another embodiment, the affixation 125 can be a logical construct that can describe the results of a fastening event without having an actual independent identity. For example, the affixation 125 can be a logical construct describing the occurrence of a fastening event that is actually stored within metadata attributes of the digital seals that were involved with the fastening event. Regardless of whether the affixation 125 is implemented as a discrete software object or as a logical construct, the concept of an affixation 125 can be useful for describing relations that exist among digital seals, electronic documents, and users resulting from fastening application 145 bindings.

As used herein, an electronic document 115 need not be an electronic analogue to a paper document but can include any type of electronically storable software object. For example, the electronic document 115 can include a word processor document, a graphic object, a chart, a sound file, as well as a multimedia object such as a video clip. Notably, the electronic document 115 need not exist within a permanent memory location, such as a hard drive, but can, instead, exist within a temporary storage location, such as random access memory (RAM).

Notably, when a fastening peripheral 150 is utilized by the fastening application 145, the binding event can have increased significance to each involved user 120. In other words, the increased user involvement necessitated by the fastening peripheral 150 can more firmly implant the storing event in the mind of the user 120. Accordingly, the user 120 can more easily recall the storing event at a later date. Thus, the user 120 can more easily retrieve previously stored electronic documents utilizing system 100 than the user 120 could if storage had occurred utilizing a conventional file management system not involving the fastening peripheral 150.

Figure 2:
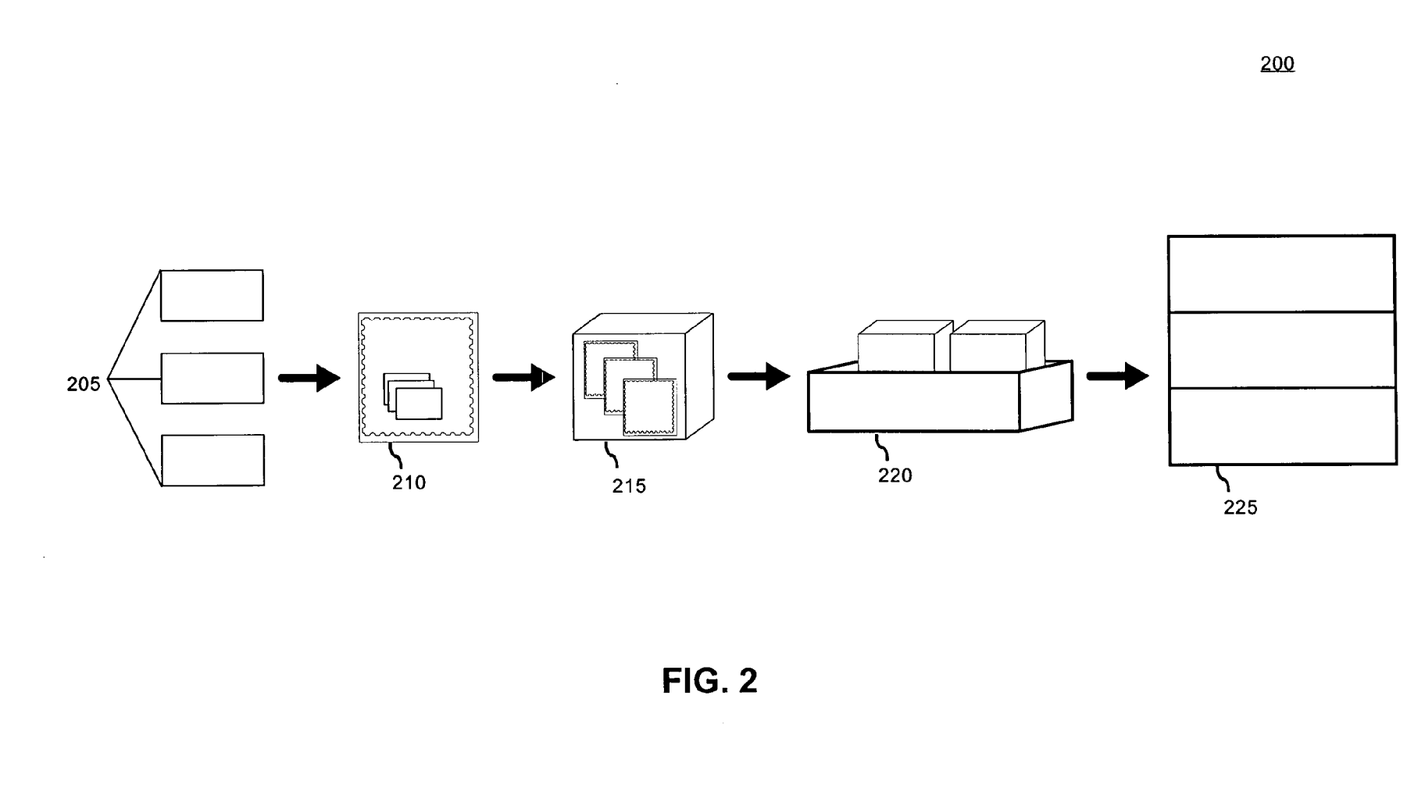
FIG. 2 is a schematic diagram illustrating an exemplary seal container structure in accordance with the system of FIG. 1.

FIG. 2 is a schematic diagram illustrating a system 200 for a digital seal container structure in accordance with the inventive arrangements disclosed herein. The system 200 can include one or more seal options 205, a digital seal 210, a seal box 215, a seal drawer 220, and a seal cabinet 225. It should be noted that real world analogues can be extremely useful for developing electronic data management systems intuitively understandable by most humans. By extensively utilizing user configurable graphics, colors, and multimedia objects within each facet of the digital seal container structure, strong analogies with human experiences can be created. Furthermore, users can create a unique hierarchy of container objects and construct personalized analogues. These created analogies can have substantially greater user meaning than the analogues of conventional file management systems.

The seal option 205 can represent metadata associated with a particular digital seal 210. Metadata can include, but is not limited to, security attributes, associated electronic documents, seal tracking information, as well as presentation attributes for the seal option 205. Security attributes can apply to the digital seal 210 and/or to electronic documents associated with a particular digital seal. Security attribute information can contain encrypted keys, group restrictions, and biometric requirements. For example, one security attribute can specify that only users possessing a particular pubic key can retrieve documents associated with the digital seal 210. Another security attribute can specify that only users belonging to a particular group can utilize a particular seal. Seal tracking information can contain creation, modification, and usage information about the digital seal 210 including dates, locations, and users involved in tracked events.

Presentation attributes can include system and user specific attributes. For example, predefined presentation attributes can cause low resolution graphics to be utilized for the seal option 205 on one system and high resolution graphics to be utilized on a different, more capable system. Presentation attributes for the seal options 205 can mirror options that are available to humans utilizing a physical, real world seal. For example, in one embodiment, different seal options can be depicted as different colored seals. In another embodiment, different seal options can determine the type of seal used, such as a wax seal, an embossed seal, or a stamped seal. In yet another embodiment, different variations of a seal design can be utilized to depict different seal options.

The digital seal 210 can be an associative object configured to form associations with electronic documents. The associations between digital seals and electronic documents can form one to one, one to many, many to one, and many to many relationships. Accordingly, one digital seal 210 can be associated with one or more electronic documents and one electronic document can be associated with one or more digital seals. Notably, associated electronic documents can be affected by a particular seal option 205 of the digital seal 210 to which the electronic documents are associated.

For example, if a digital seal 210 is associated with two electronic documents and a seal option 205 of the digital seal 210 requires an authorization code, neither of the two associated electronic documents can be retrieved from storage without the authorization code being inputted. In another example, one electronic document can be associated with two or more digital seals, each with an authorization code requirement. In such an example, both authorization codes can be necessary before the electronic document can be retrieved. Digital seal 210 authorization codes can utilize any security and/or encryption scheme known in the art including, but not limited to, passwords, private-public key combinations, digital certificates, and the like.

For example, the Secure Sockets Layer (SSL) or the Transport Layer Security (TLS) protocols can be used to provide authorization and security for electronic documents associated with the digital seal 210. The mechanisms involved with these two exemplary protocols and their associated derivative implementations are well known and commercially available implementations provided by companies such as Microsoft of Redmond, Wash. and Sun Microsystems of Palo Alto, Calif. exist. In another example, an authorization code for the digital seal 210 can be linked to an image. In such an example, a user can encrypt the electronic documents associated with a digital seal 210 by locking or "sealing" the digital seal 210 with the selected image. The selected image will, thereafter, be required before the encrypted documents can be decoded. Moreover, multiple images can be used to encrypt a particular digital seal 210. Each of the multiple images can represent either a complete or a partial access code, wherein multiple partial codes and therefore multiple images can form a complete access code and thereby be necessary before the encrypted documents can be decoded. Additionally, a public/private key variation that is based on the linked images can be used. That is, a first and second image can be established as access codes or keys, wherein the second image can be used to encrypt the documents associated with a digital seal 210. Anyone possessing the first image, however, can still decode the encrypted documents associated with the digital seal 210.

Additionally, the digital seal 210 can include multiple presentation attributes. These presentation attributes can include multimedia objects. For example, in one embodiment, the digital seal 210 can include a static graphic, a color, a shape, a text block, a sound, and a video. Each of these presentation attributes can be used to identify the digital seal 210. Furthermore, Boolean operators can be used when selecting a set of digital seals utilizing presentation attributes. For instance, in a particular example, a user can select and subsequently be presented with a set of digital seals with a presentation attribute of the color blue. In an alternate embodiment, a user can select a set of digital seals associated with a wedding video or a song. In yet another embodiment, all digital seals associated with a particular work graphic and not associated with a selected client color can be presented to the selecting user.

Multiple container objects can exist that are configured to store collections of digital seals. Furthermore, a hierarchy can be established among different container objects. Like digital seals, a container object can contain multiple presentation attributes including multimedia objects. Additionally, the container object can be selected based upon these presentation attributes.

In FIG. 2, the seal box 215, the seal drawer 220, and the seal cabinet 225 can be container objects. Many digital seals can be stored within the seal box 215, many seal boxes can be stored within the seal drawer 220, and many seal drawers can be stored within the seal cabinet 225. Each container object, such as the seal box 215, the seal drawer 220, and the seal cabinet 225, can be labeled, color coded, locked, removed, interchanged, broken, repaired, or otherwise manipulated within the user interface according to assigned presentation attributes.

In operation, a plurality of seal cabinets 225 can be presented within a user interface. Each of these seal cabinets 225 can be labeled with a text block, such as work, home, and recreation. When a user moves a pointing device over the drawers of a seal cabinet 225, a color coded text popup can be displayed. For example, if the pointing device is positioned over the first seal drawer of the work cabinet, a green popup labeled meetings can be displayed. When the pointing device is positioned over the second seal drawer of the work cabinet, a red popup labeled clients can be displayed. Positioning over the third drawer can cause a yellow popup labeled projects to be displayed.

The user can select a particular seal drawer 220, resulting in an opening sound and the selected drawer opening within the user interface. The open seal drawer can expose a couple of seal boxes containing different colored and shaped digital seals. For example, the projects drawer can be opened to reveal a brown seal box labeled active projects and a gray box labeled active inactive projects. Each seal box 215 can expose the tops of various digital seals. Positioning a pointing device over any exposed digital seal 210 can result in a popup screen having the same color as the corresponding digit seal to be displayed. For example, positing the pointing device over an orange digital seal 210 can result in an orange text box labeled laser project to be displayed.

The selection of a particular digital seal 210 can cause a document selection popup window to be displayed. This document selection window can contain representations for the electronic documents associated with the selected digital seal 210. Selecting an electronic document from within the document selection window can result in the retrieval of that electronic document.

It should be noted that the container system shown in system 200 is just one of the possible container systems for the invention. Other systems based upon different analogues are contemplated. These analogues are possible due to the flexibility of the presentation attributes associated with the metadata attributes, the associate object, and the container objects. For example, instead of utilizing a cabinet/drawer/box/seal hierarchy as an analogue, an analogue based upon a warehouse storing system can be utilized. In such an embodiment, the associative item can be represented as an inventory part with the metadata attributes being represented by different part types. Container objects such as shelves, aisles, and warehouses can be utilized in the warehouse analogy.

Different analogues can be tailored for different users of the invention. For instance, a secretary can use a cabinet analogue, a warehouse employee a warehouse analogue, and a librarian a library analogue. The ability to utilize different analogues in the invention for different applications of the invention can enable particular human users to more easily interact with the user interface. Accordingly, different real world analogues can be extremely useful for developing electronic data management systems intuitively understandable by humans.

Figure 3:
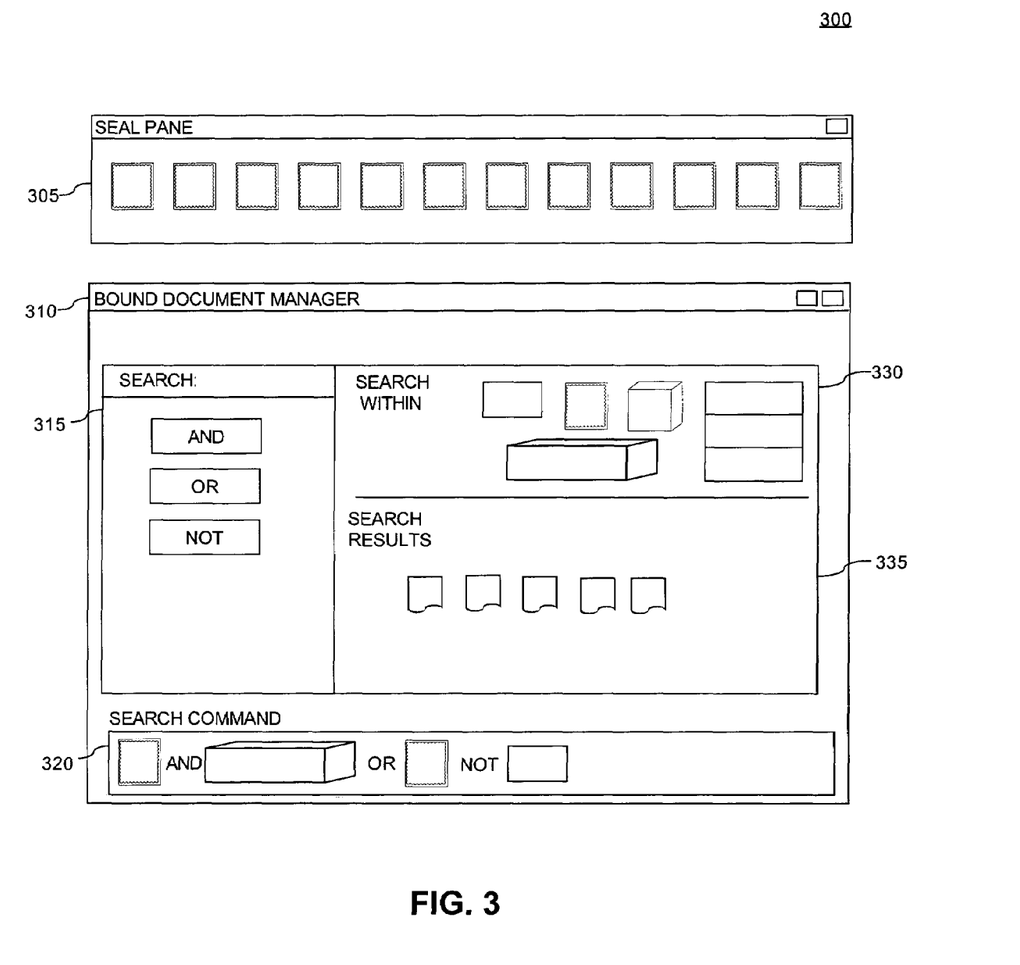
FIG. 3 is a schematic diagram illustrating an exemplary electronic search and retrieval mechanism in accordance with the system of FIG. 2.

FIG. 3 is a schematic diagram illustrating a system 300 providing an exemplary electronic search and retrieval mechanism in accordance with the system of FIG. 2. The system 300 can include a seal pane 305 and a bound document manager 310 including an operator region 315, a container region 330, a result region 335, and a command region 320. The seal pane 305 can display digital seals stored within the seal repository which have been retrieved. The seal pane 305 also can be used to perform digital seal related storage management operations, such as seal creation, modification, retrieval, and binding. In particular embodiments, the seal pane 305 can be functionally linked or integrated to the bound document manager 310.

The bound document manager 310 can be an electronic document management application capable of retrieving electronic documents based upon associated digital seals. The bound document manager 310 can allow a user to select seal options, digital seals, and/or seal containers and retrieve an associated document set. Furthermore, particular mathematical functions can be performed against the user selections to alter the resulting electronic document set.

For example, a user can select a first digital seal associated with two electronic documents, A and B. The bound document manager 310 can cause the two electronic documents, A and B, to be displayed. In another example, a second digital seal can be associated with two different electronic documents, C and D. If the user performs an operation specifying the first digital seal OR the second digital seal, documents A, B, C, and D can be displayed. If the user performs an operation specifying the first digital seal AND the second digital seal, no documents can be displayed as a result.

Operator region 315 can allow for the selection of mathematical operators that are available within the bound document manager 310. Operators can include, but are not limited to, AND, OR, NOT, and XOR. The operator region 315 can be implemented in many forms. For example, the operator region 315 can display operators that are selectable with a pointing device. In another example, parameters representing operators can be entered into a text box within the operator region 315.

The command region 320 can display presently operating or active commands. Additionally, the command region 320 can provide functions to store and recall previously executed commands. For example, in a particular embodiment a user may want to select electronic documents associated with meetings that are to occur within the upcoming week. Assuming appropriate seal options, digital seals, and seal containers exist to allow such a command to be constructed, the command can be constructed once and saved. Thereafter, the command can be recalled executed as desired. As shown, the command region 320 can perform any of a variety of logical operations using seal options, digital seals, seal boxes, seal drawers, and seal cabinets.

The container region 330 can allow for the selection of various containers. This selection can alter the container level of other sections of the bound document manager 310 or the seal pane 305. For example, assume the seal pane 305 presently displays a selection of digital seals, yet the user wishes to instead select a seal container, such as a seal cabinet. In one embodiment, the user could highlight the seal pane and select a cabinet icon within the container region 330. As a result, the seal pane 305 can be altered to display a selection of seal cabinets. It should be noted that because a seal cabinet is a container object within an object hierarchy above a digital seal, selection of a seal cabinet can be equivalent to selecting each digital seal contained within the seal cabinet. In another embodiment, commands can be formed by dropping and dragging selections from within the container region 330 to displayed buttons within the operator region 315.

The result region 335 can display all electronic documents satisfying the criteria of a particular command within the bound document manager 310. Users can select electronic documents displayed within the result region 335 causing the selected electronic documents to be retrieved. In one embodiment, a visual symbol denoting associated digital seals can be included within documents displayed within the result region 335. For example, if one electronic document displayed within the result region is associated with a digital seal having a green circular graphic, a small green circular graphic can appear within a corner of the displayed electronic document.

In operation, a user can access the seal pane 305 to select a first seal. The selected digital seal can be dragged over a region labeled AND within the operator region 315 of the bound document manager 310. After dragging the seal, the command region 320 can be updated by the bound document manager 310 to display a visual representation of the selected digital seal followed by the AND operator. Additionally, the result region 335, previously blank, can display all electronic documents associated with the selected digital seal.

At this point, the user can highlight the seal pane window 305. Then, the user can select a seal box icon from within the container region 330. As a result, the selections within the seal pane 305 can be altered to contain seal boxes. The user can select a particular seal box and drag it over a region labeled OR within the operator region 315 of the bound document manager 310. After the dragging of the seal box, the command region 320 can be updated by the bound document manager 310 to display a visual representation of the selected box followed by the OR operator. Accordingly, the command region 320 can now display the selected digital seal, the AND operator, the selected seal box, and the OR operator. The result region 335 can be responsively updated to include all electronic documents associated with seals contained within the selected seal box AND the seals associated with the selected digital seal.

It should be apparent to one of ordinary skill in that art that while the examples for the command region 320 utilize Boolean operations, the invention is not so limited. For example, a union, an inner join, an outer joint and other operations based upon set theory can be utilized by the invention. Additionally, although no parenthesis for altering default order of operations were shown in the examples given for system 300, expressions including parenthesis are contemplated by the invention.

Further selections can further alter the command within the command region 320 and can cause corresponding changes in the result region 335. Additionally, a command can be saved using functions within the command region 320. At any point, a user can select one or more electronic documents presented within the result region 335 causing the selected electronic document or documents to be retrieved from storage.

It should be noted that the exemplary bound document manager 310 is for illustrative purposes only and is not intended to limit the manners in which a bound document manager can be implemented. In particular, the bound document manager 310, as shown in FIG. 3, is a two dimensional graphical user interface. In another embodiment, however, the bound document manager 310 can be a three dimensional interface or can be a virtual reality interface.

Figure 4:
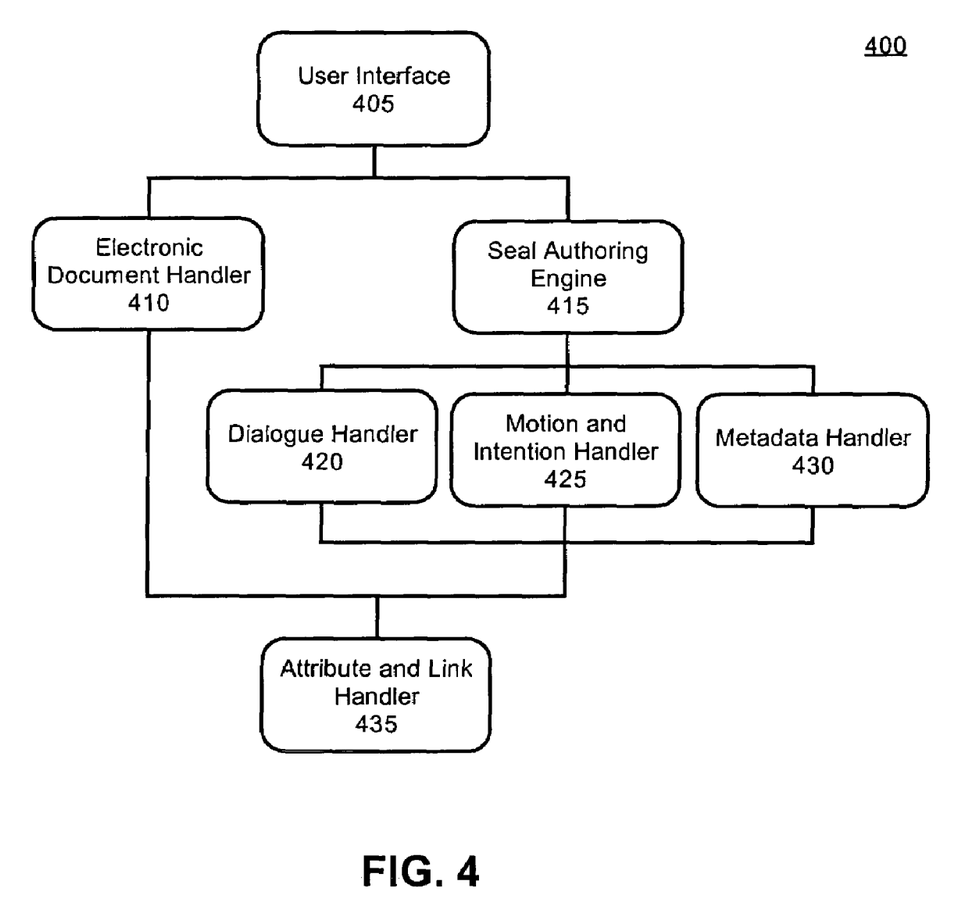
FIG. 4 is a schematic diagram illustrating an exemplary front end for an electronic document management system in accordance with the system of FIG. 1.

FIG. 4 is a schematic diagram illustrating a system 400 modeling an exemplary front end for an electronic document management system in accordance with the system of FIG. 1. The system 400 can be contained within a single machine, such as a server, or distributed over a network. As shown in FIG. 4, the system 400 can include a user interface 405, an electronic document handler 410, a seal authoring engine 415, a dialogue handler 420, a motion and intention handler 425, a metadata handler 430, and an attribute and link handler 435. The user interface 405 can provide event driven interactions between a user and a previously defined user environment. The user interface can contain two functionally separate areas, one for electronic document handling and the other for digital seal handling.

The electronic document handler 410 can be responsible for displaying electronic documents at the proper locations within the user interface 405. The electronic document handler 410 can also associate electronic documents with particular operating system tools and collect any changes that occur to the electronic documents. Some attributes that can be associated with the electronic document handler 410 can include, but are not limited to, file format attributes, category designators, a list of associated digital seals, application associations for linking the electronic documents to an appropriate application, history and usage attributes, and access and security attributes.

The seal authoring engine 415 can be used to create, modify, or delete digital seals. As shown in FIG. 2, the seal authoring engine 415 can be an analogy of a real world environment instead of being an analogy based on a computer's file storage structure. As shown in system 400, the seal authoring engine 415 can include a dialogue handler 420, a motion and intention handler 425, and a metadata handler 430.

The dialogue handler 420 can perform the interface windowing and object positioning tasks within the user interface 405 that pertain to digital seals. For example, positioning events causing a digital seal to be presented at a different location can be handled by the dialogue handler 420. In another embodiment, color, size, and preference settings for digital seals can be maintained by the dialogue handler 420.

The motion and intention handler 425 can utilize heuristics and historical data to interpret user intentions. For example, the motion and intention handler 425 can present a frequently used digital seal within a dynamically modified quick selection list. Additionally, the motion and intention handler 425 can suggest shortcuts and configuration options that can save the user time. In one embodiment, the motion and intention handler 425 can include a learning neural network tracking all interactions of similarly profiled users to properly anticipate desirable actions.

The metadata handler 430 can display and modify metadata information contained within a digital seal or an electronic document. For example, the seal option information detailed in FIG. 2 can be handled by the metadata handler 430. The attribute and link handler 435 can provide low level management for objects presented within the user interface 405. For example, the attribute, and link handler 435 can maintain basic association relationships between electronic documents and digital seals. Additionally, the attribute and link handler 435 can maintain hierarchical relationships among digital seals and seal containers. Furthermore, the attribute and link handler 435 can contain linking information necessary to retrieve selected electronic documents from a storage system.

Figure 5:
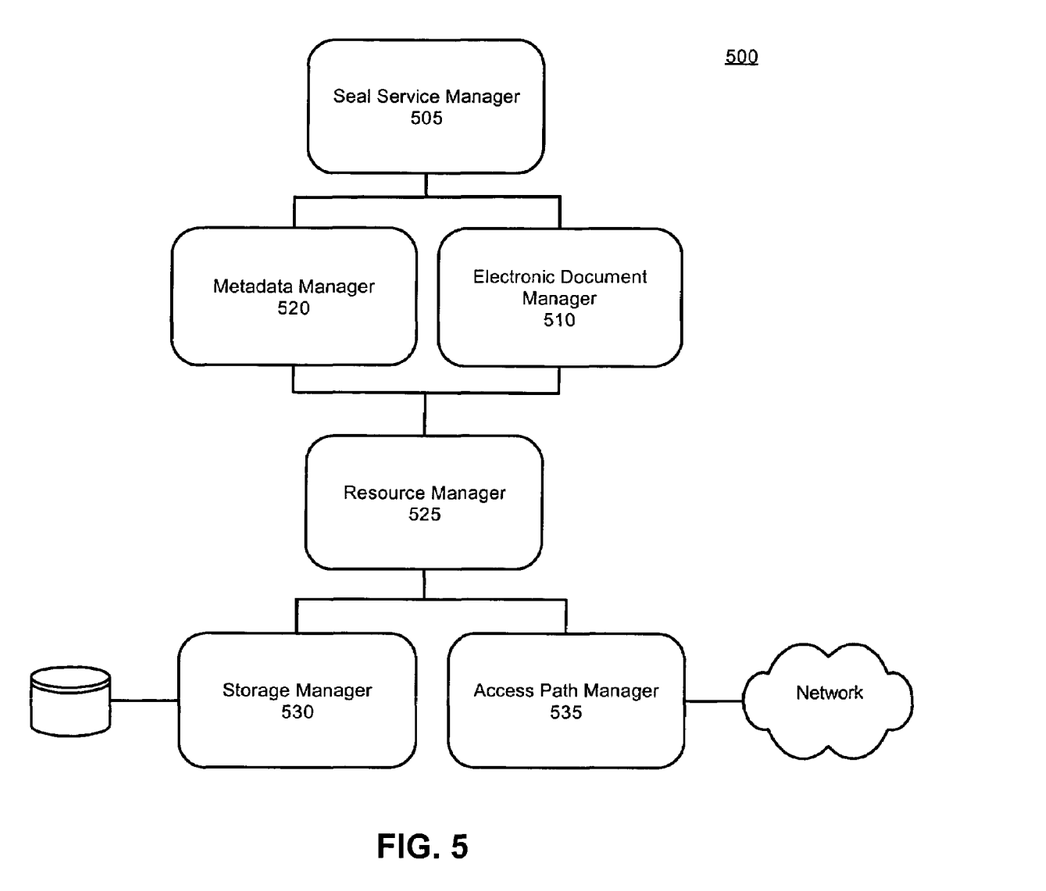
FIG. 5 is a schematic diagram illustrating an exemplary back end for an electronic document management system in accordance with the system of FIG. 1.

FIG. 5 is a schematic diagram illustrating a system 500 modeling an exemplary back end for an electronic document management system in accordance with the system of FIG. 1. The system 500 can be contained within a single machine, such as a server, or distributed over a network. The system 500 can include a seal service manager 505, a metadata manager 520, an electronic document manager 510, a resource manager 525, a storage manager 530, and an access path manager 535. The seal service manager 505 can maintain relationships between stored electronic documents and digital seals.

The electronic document manager 510 can be the top level processing component for electronic documents. All higher levels of abstraction can store and recall electronic documents using the electronic document manager 510 without knowing physical storage details. Accordingly, the seal service manager 505 can transmit an electronic document retrieval request to the electronic document manager 510 without specifying whether the electronic document was stored locally or stored within a networked location. In one embodiment, because physical storage details are abstracted by the electronic document manager 510, the electronic document manager 510 can relocate electronic documents without affecting operations performed by the seal service manager 505.

The metadata manager 520 performs storage functions for digital seals and associated metadata similar to functions performed by the electronic document manager 510 for electronic documents. The metadata manager 520 can be responsible for handling relations between metadata and digital seals, between one digital seal and another digital seal, and between digital seals and container objects.

It should be noted that decoupling digital seal functions from electronic document functions can allow the invention substantial storage flexibility. For example different applications utilizing the system 500 can have different timing requirements. In one embodiment, a first application can have a very fast seek requirement yet have a comparatively slow document retrieval requirement. A second application can have opposite requirements, needing modest seek efficiency and very fast document retrieval requirements. The electronic document manager 510 can utilize different algorithms and hardware to satisfy the requirements of both the first application and the second application. Both electronic document manager 510 and metadata manager 520 can be separately adjusted to suit individual storage characteristics imposed by various applications.

The resource manager 525 can handle resource allocation tasks of system 500. More particularly, the resource manage 525 can monitor the system 500, can collect data and can make adjustments to most effectively utilize the total resources of a system. For example, the resource manager 525 can grant one user defined by administrators as a crucial user more system resources than a standard user. In one embodiment, the resource manager 525 can be a rules based system of quotas and preferences. In another embodiment, the resource manager 525 can determine a storage distribution between local and networked storage devices, shifting data as resource load demands. In yet another embodiment, the resource manager 525 can be a dynamic system capable of adjusting system resources based upon predefined heuristics, neural networks, and real time resource monitors.

The storage manager 530 can manage local storage resources including, but not limited to, removable storage, such as a tape storage devices, temporary storage, such as random access memory, and fixed storage, such as hard drives. Moreover, the storage manager 530 can perform information backups and recovery operations. Accordingly, data on a failing hard drive could be reallocated to other resources of the storage manager 530.

The access path manager 535 can maintain network identification parameters for non-locally stored items. For example, the access path manager 535 can store a network domain address for a given storage location associated with a particular electronic document. The access path manager 535, however, is not limited to storing network identifiers under any particular protocol and can access storage locations utilizing any determinable mechanism.

The various GUIs disclosed herein are shown for purposes of illustration only. Accordingly, the present invention is not limited by the particular GUI or data entry mechanisms shown. Rather, those skilled in the art will recognize that any of a variety of different GUI types and arrangements of data entry, fields, selectors, and controls can be used.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for storing electronic documents comprising the steps of:
   - associating at least one electronic document stored in a network storage system with an associative object represented by a digital seal, wherein the digital seal uniquely corresponds to an image of a seal, stamp, or tape that is visually displayable within a user interface;
   - displaying said image within said user interface;
   - presenting at least one multimedia object within said user interface, wherein said multimedia object is a user selectable representation for said associative object;
   - moving the displayed image within the user interface as said digital seal is associated with said at least one electronic document so as to visually simulate said image being affixed to said at least one electronic document;
   - generating an audio signal when the displayed image is moved adjacent to or over another image within the user interface representative of the at least one electronic document so as to audibly simulate said image being affixed to said at least one electronic document;
   - storing one or more metadata attributes for said associative object, said metadata attributes specifying one or more characteristics related to said associative object, wherein at least one of said characteristics comprises one or more authorization codes required before allowing said at least one electronic document to be retrieved, and wherein at least one of said characteristics comprises biometric fingerprint data associated with at least one user; and
   - responsive to said document being associated with said associative object, modifying a storage location in said network storage system of said at least one electronic document based on at least one of said stored metadata attributes, wherein said modified storage location is at least one among a new physical storage location and a new logical storage location in said network storage system.

2. The method of claim 1, wherein said associative object is said digital seal.

3. The method of claim 1, wherein at least one of said authorization codes is valid for a first user and invalid for a second user.

4. The method of claim 3, wherein at least one appearance attribute of said digital seal is altered in response to one of said required authorization codes being received and validated.

5. The method of claim 1, further comprising the step of:
   - associating a second digital seal with one of said at least one electronic document using a second associative object.

6. The method of claim 5, wherein said digital seal includes a first authorization code, and wherein said second digital seal includes a second authorization code, said method further comprising the step of:
   - requiring said first authorization code and said second authorization code before said one of at least one electronic document can be retrieved.

7. The method of claim 1, further comprising the steps of:
   - establishing a first authorization code for said digital seal, wherein said first authorization code is associated with a first image;
   - encoding said at least one associated electronic documents with a second authorization code associated with a second image; and,
   - decoding said at least one associated electronic documents using at least in part said first image.

* * * * *